Figure 2:
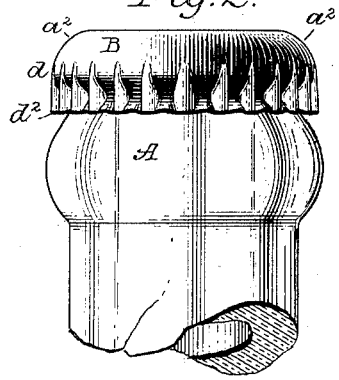

(No Model.)

W. PAINTER.
BOTTLE SEALING DEVICE.

No. 468,226.                           Patented Feb. 2, 1892.

Attest:
Philip F. Larner.
Howell Battle.

Inventor:
William Painter
By Wm C Wood
Attorney

UNITED STATES PATENT OFFICE.

WILLIAM PAINTER, OF BALTIMORE, MARYLAND.

BOTTLE-SEALING DEVICE.

SPECIFICATION forming part of Letters Patent No. 468,226, dated February 2, 1892.

Application filed May 19, 1891. Serial No. 393,293. (No model.)

*To all whom it may concern:*

Be it known that I, WILLIAM PAINTER, of the city of Baltimore, in the State of Maryland, have invented certain new and useful Improvements in Bottle-Sealing Devices; and I do hereby declare that the following specification, taken in connection with the drawings furnished and forming a part of the same, is a clear, true, and complete description of the several features of my invention.

My present invention pertains to the sealing of bottles by the use of compressible packing-disks and metallic caps, which have flanges bent into reliable locking engagement with annular locking-shoulders on the heads of bottles, while the packing-disk is in each case under heavy compression and in enveloping contact with the lip of the bottle.

In order that the status of my present improvements may be properly defined with respect of novelty and utility, I deem it proper to briefly review the prior art in this special connection. So far as my knowledge extends, I am the first to seal bottles by means of sealing-disks each compressed into close solid contact with the lip of the bottle and maintained in that condition by means of a flanged metallic sealing-cap, the flange of which is bent or crimped into locking contact (while the disk is under pressure) with an appropriate annular locking-shoulder on the head of the bottle, as well as the first to devise methods and means by which in the use of such caps and disks liquids can be bottled under even the highest gaseous pressures employed in this art. Disclosures of my several prior inventions in this line have been made by me in certain of my applications for patents heretofore filed. (See Serial Nos. 323,314 and 355,603.)

Inasmuch as the application of my sealing-caps involves powerful mechanism for compressing the disks and for bending or crimping the flanges of the caps into locking contact with bottles, it follows that considerable manual force must be applied for detaching the caps from the bottles, and therefore in the early stages of my invention the use of loops of some kind or of equivalent holes in the tops of the caps was deemed essential, and the caps had wide or deep pendent flanges and they contained sealing-disks of considerable bulk or thickness. During further progressive stages of my invention I demonstrated the economic importance of using thin disks, and these in some forms preclude the use of a cap having either a hole in its top or even some forms of inserted loops. These contingencies led, after much devising and experimenting, to the production of a cap without a loop or a hole in its top, a thinner disk, and consequently narrower flanges, thus substantially reducing the cost of the sealing device as a whole without decreasing, but in fact increasing, the efficiency of the applied cap, and also securing higher sealing efficiency by the use of a less expensive disk. The flange of the cap being narrow and its locking or bent portions being between the edge of the flange and the top of the cap, and the said edge being practically intact or continuous the cap could be applied to a bottle with a tenacity at least equal to, if not greater than, the caps having wider and consequently more flexible flanges, and hence as much or more manual force was required for detaching said caps than with those of the said previous forms. These improved caps having in themselves no special provision—such as loops or openings in their tops—for detaching them from bottles led to my further devising a novel method of their combination with the bottle, in accordance with which the pendent edge of the flange below the bent portion is so far projected from the adjacent surface of the bottle-head as to afford an engaging-shoulder, to which a bottle-opener could be readily applied; but the required manual force to remove the cap was so great that openers of special form were a necessity, and these were operated by leverage and were fulcrumed either upon the top surface of the cap or upon the outwardly-rounded surface of the bottle-head below the cap. The disadvantages to consumers incident to a positive requirement for the use of specially-constructed openers are obvious, and to avoid them I have now so devised my loopless and close-topped caps and have so organized a combination thereof with the bottles that the caps can be almost as readily detached by the use of a knife, a screw-driver, a nail, an ice-pick, or any usually and readily available pointed instrument as if a special opener were used, the latter being, of course, always preferable when bottles are required to be opened rapidly. My present caps in their best forms have outwardly-flared edges, and the heads of the bottles below their locking-shoulders are of such form and diametrical dimensions that when the cap is locked upon the bottle there is ample space below and at the rear of the flange to admit of the free insertion of any pointed or thin-edged device capable of serving as a bottle-opener by prying the flange outwardly from the locking-rib at several points and thus releasing its hold thereon. The projected edge of the cap so applied also enables the use therewith of special bottle-openers operating as levers, as with my prior caps. When a special bottle-opener is employed, quite heavy detaching force is necessary, because of the practically simultaneous detachment of the cap from the shoulder on the bottle at many points of locking contact; but in operating within the space at the rear of the pendent edge of the flange, as with a knife-blade, for instance, the detachment is gradually effected at each of the points of locking contact, and hence but little manual force is required.

Now with relation to sealing-disks it is to be understood that at the outset I was well aware that cork was the most desirable material; but in view of the high cost of cork and of the presence therein of holes or pits and the apparent necessity that cork disks should be of considerable thickness prompted the devising by me of various substitutes for cork, some of the best of which have been disclosed in my aforesaid prior applications. Some of said disks were essentially quite thick, and hence I first used therewith a flat-topped cap and a bottle having a sharp-edged lip, which was embedded in the disk. With the thinner disks next used with narrow flanged caps such a deep embedding of the lip as was practicable and desirable with the thick disks was rendered objectionable, and hence I used a flat-topped cap and a bottle having a flat-edged lip. With both the thickest and the thinner disks there was a more or less, but far from extensive, packing contact with the annular surfaces inside and outside of the bottle-lip. I have now provided for a specially extensive area of packing contact by using a bottle having a lip well rounded on its outside and a thin disk capable of enveloping and lying in close conformity with the said outer rounded surface. I am thus enabled to secure very satisfactory results with very thin composite compressible disks and caps of a minimum size and weight, because a large proportion of the area of the disk is interposed between coincident surfaces of the cap and the outer rounded surface of the bottle-lip, and said disk is maintained under very high compression. At this stage of my invention I realized that inasmuch as such very thin disks of the composite types (linoleum, felt-paper, with various protecting-coatings, &c.) could be successfully used it would warrant the use of cork, even of the most expensive grades, because said sealing-disks may be normally not thicker than, say, one-sixteenth of an inch. While pursuing this line of experiment I made what may be termed a "paradoxical discovery"—viz., that with the extensive areas of contact and compression now provided by me and with the attendant possibility of using extremely thin disks a perfect gas and liquid sealing effect could be secured and practically maintained for an indefinite time by the use of disks composed of the cheap and ordinary grades of cork, which are well known to contain numerous holes and pits and also streaks of matter quite unlike the main or effective portions of the cork-wood. It is to be understood, however, to accomplish this result that the cork-wood must not only be peculiarly cut, but also subjected to special mechanical treatment. In this connection it will be remembered that in forming ordinary cylindrical or tapered bottle-corks the wood (or bark) is so cut that in each cork the lines of pits or holes are crosswise or at right angles to the axis of the cork, so that when the latter is inserted in the neck of a bottle the contact-surface of the glass closes the entrances to said holes or pits, and therefore their presence does not materially impair the sealing capacity of the cork. Now in cutting my disks from the wood special care is taken to have said lines of perforations or holes or pits parallel with the axis of the disk, and although the disks may be no thicker than one-sixteenth of an inch and be in fact reticulated or perforated they are nevertheless reliable sealing-disks as used by me, because the holes or perforations are so far surrounded by masses of true cork that when the disks are heavily compressed the cork around each hole is rendered impermeable and the ends of each hole are tightly closed, respectively, by the coincident inner surfaces of the rounded topped cap and the outwardly-rounded bottle-lip.

Now as to the necessity for mechanical treatment of the cork disks, I will state that cork-wood (especially the cheaper kind) contains numerous small masses of hard, solid, and almost flinty matter wholly unlike that of the true cork-wood, and it is quite difficult to get a disk which does not contain several of these hard spots. Such hard spots will not become softened by soaking in hot water or steaming, as is usually employed with corks. If such disks be used for sealing, the heavy pressures incident to the application of the caps are insufficient for crushing said hard masses of matter, and their presence would be sometimes indicated by well-developed indentations in the tops of the caps (notwithstanding they are composed of hard sheet metal) with a resultant liability of leakage. For obviating said difficulty I discovered that I must subject the cork disks to a crushing pressure, which so flattens, crushes, or disintegrates said hard masses that they cannot operate obstructively in the sealing operation. It is to be understood that said disks and the method or process of preparing them will be made the subject of a separate application for Letters Patent. (See Serial No. 417,285, filed January 7, 1892.) It is obvious that in the use of such cork disks the liquid contents of a bottle cannot be excluded by the disks from contact with portions of the cap, and therefore the interior surface of the caps is coated with an inodorous, tasteless, and practically insoluble protecting material.

For more particularly describing my invention I will refer to the accompanying drawings, and after a description thereof the features deemed novel will be specified in the several clauses of claim hereunto annexed.

Figure 1:
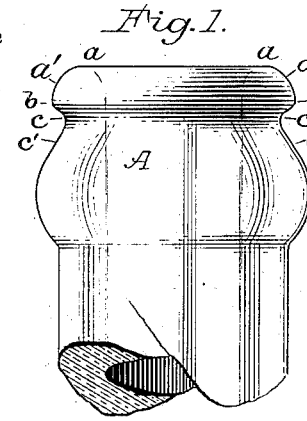
Figure 3:
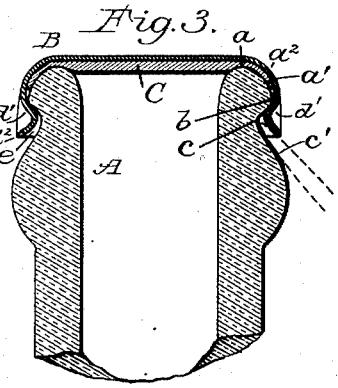
Figure 4:
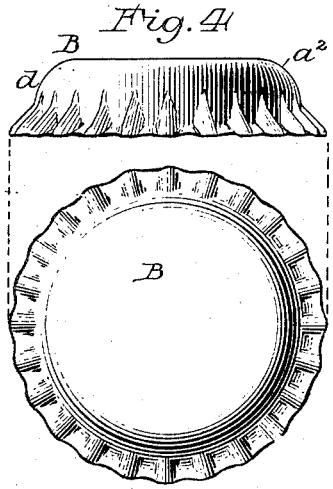
Figure 8:
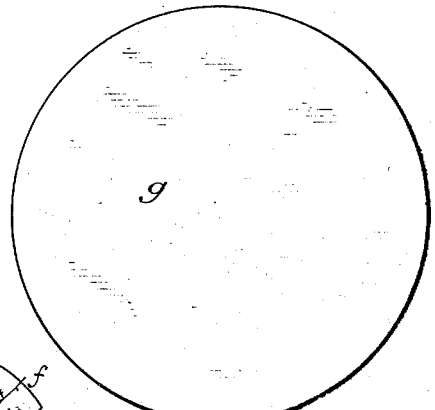
Figure 6:
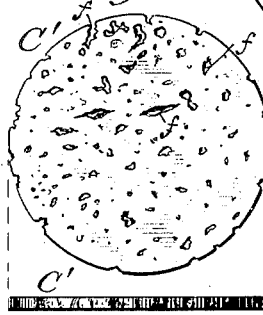
Figure 9:
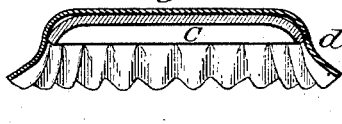
Figure 5:
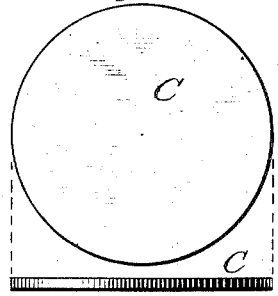
Figure 7:
Figure 10:
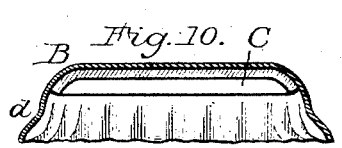

Referring to the drawings, Figure 1, in side view, illustrates a bottle-head adapted for use in combination with my cap and a sealing-disk. Figs. 2 and 3 respectively illustrate in side view and section a bottle-head with one of my caps and a sealing-disk applied thereto. Fig. 4, in side and top views, illustrates a cap prior to its application to a bottle. Fig. 5, in top and edge views, illustrates a sealing-disk of a composite character in its normal form. Fig. 6, in top and edge views, illustrates a sealing-disk in its normal condition composed of ordinary cork and fairly indicating the open or porous character of such disks as have been successfully used by me with my caps in maintaining gas or air tight closure even under much higher pressures than are ever needed in bottling. Fig. 7 illustrates a cork disk in the form which it is made o assume within the cap and after it has been subjected to heavy pressure for reducing its hard spots. Figs. 8, 9, and 10 respectively illustrate a sheet-metal blank from which the cap is formed, the shape first developed therefrom and the final shape, these being in section with the sealing-disks therein.

Commencing with the bottle-head A, (shown in Fig. 1,) it is to be understood that it differs from such as have been heretofore devised by me in the contour of its lip and of the packing-surface outside of and below said lip above the locking-shoulder, as well as below said shoulder. The lip $a$ is well rounded instead of being quite angular, sharp, or flattened, as in different forms of my prior bottles, and the exterior packing-surface $a'$ below the lip is also well rounded instead of being, as before, quite straight and inclined. The locking-shoulder $b$ is substantially as in some of my prior bottles; but from the recess $c$ below the shoulder downwardly, as at $c'$, the surface of the head is straight or inclined for a short distance instead of being quite abruptly rounded outwardly, as in my prior forms. These differences in form are each of importance in the attainment of some of the specific results now sought by me, as will be hereinafter made apparent.

The metal cap B and its disk C or C' will first be described in connection with those features which specially relate to their combination with a bottle having a locking-shoulder on its head and constructed, as described, below said shoulder, and it is now to be understood that after a bottle has been filled and the cap, with its disk, has been placed thereon heavy pressure is then applied to the cap and disk, and then the flaring edge of the flange $d$ of the cap is so bent downwardly and inwardly that an annular portion of said flange, as at $d'$, is forced beneath and into reliable engagement with said locking-shoulder; but instead of the lower inside edge of the flange lying closely against the surface of the glass, as heretofore provided for by me, the said edge, by reason of its being now beveled outwardly and also by reason of the shape and dimensions of the bottle-head adjacent to said edge, stands off from the surface of the glass, so as to thereby afford a free annular space at $e$ between the lower portion of the flange and the adjacent surface of the head, and a free entrance to said space is secured for the ready insertion of any sharp or pointed instrument, as indicated in dotted lines in Fig. 3, for service as a bottle-opener by prying the flange of the cap outwardly from the locking-shoulder, as previously described. It will now be seen, although the cap would be well locked and although this bottle-head need be neither unduly large in diameter nor in length, that the flange of the cap may be of a lesser diameter than that of the rounded portion of the head, notwithstanding the liberal annular space $e$ at the rear of the flange. As the result of this peculiar and novel combination of the cap and bottle no special bottle-opener is needed, although the edge $d^2$ of the cap-flange is so well projected that special bottle-openers may be used, if desired. Any form of sealing-cap applied to and in combination with a bottle-head which is recessed below the locking-shoulder and below and at the rear of the flange and which affords the freely-accessible annular space $e$ will involve this portion of my invention.

Now, more specifically describing the sealing-cap B, as shown in Fig. 4 and as it appears prior to its application to a bottle, it differs from any of my prior caps in that at the junction of the flange and top it is well rounded, as at $a^2$, so that its corresponding inner surface will correspond with or conform to the rounded packing-surface $a'$ on the bottle-head, this being an essential feature when thin sealing-disks C or C' are used. As these disks are not or need not normally be more than one-sixteenth of an inch in thickness, and as they are generally reduced to at least one-fourth of that thickness by the requisite sealing compression, it is obvious that the surfaces between which the disk is compressed should be thoroughly coincident, or at least in substantial conformity. With the thick or heavy disks as heretofore used by me and with caps rounded to a minimum or to any degree at the junction of the flange and top and whether the bottle-lips were flat or sharp, the main point sought was the embedding of the lip in the disk. A comparison of my caps, disks, and bottles and their combination as now disclosed with my prior caps, disks, and bottles and their combination as heretofore devised and disclosed by me, will enable it to be seen that my present improvements involve novel principles of substantial value. With a sharp-lipped bottle and the flat-topped cap a disk as now used by me would be inevitably cut on the line of compression and the sealing effect defeated; but with the outwardly-rounded lip and the extended area of packing contact and the correspondingly-formed cap no cutting action is possible. The thick disks as before used and applied by me were essentially impermeable to liquid, and the sealing effect was due, mainly, to the packing contact between the impermeable surface of the disk and the lip of the bottle; but with the thin disks and the rounded coincident surfaces of the bottle-head and the cap permeability of the disk is a matter of no consequence so far as relates to the sealing effect, as will now be made fully apparent.

Referring to Figs. 6 and 7, it is to be understood that the sealing-disk C' is composed of a thin slice of cork-wood of a low ordinary grade and full of pits or irregularly-shaped holes $f$, which extend completely through the disk, so that when such a disk is held up to the light and close to one's eye it will but little obstruct the vision. In some cases the partitions between the original holes are broken away, forming large ragged holes; but whether the holes are large or small all but those at the extreme edge of the disk are surrounded or bounded by serviceable cork, and hence when the disk is compressed between the surfaces $a^2$ of the cap and $a\,a'$ of the bottle-lip some of the small holes will be quite closed in or up by the compression of the adjacent cork, and such as are not so closed are tightly walled on one side by glass and on the other side by metal, and the several portions of integrally-communicating cork, although of extremely limited bulk, perform their packing functions more fully than when in larger masses and in the ordinary forms of bottle-corks. It will be seen, however, that, while it is essential in an ordinary bottle-cork that the lines of holes or pits in the cork-wood should be at right angles to the axis of the cork, said holes or lines of holes must be parallel with the axis of a sealing-disk, as before described.

It is obvious that with a thin disk permeable except at its compressed portion it is important that the metal cap should be so coated on its inner side that no metallic taste can be imparted to the liquid contents of a bottle, and for this purpose I apply to the interior of the caps a surfacing of inodorous, tasteless, and insoluble liquid-proof material. It is to be understood that this resistant or non-corrodible coating need only be a very thin film, and I secure the best results by the use of a fusible adhesive material which is tasteless and odorless—such as thin shellac varnish—applied to the interior of the caps and well dried, although a varnish composed of Egyptian asphaltum and aromatic benzole affords quite satisfactory results.

The combination of a metallic sealing-cap coated inside with a protecting film and a permeable or porous sealing-disk is a valuable portion of my invention, and especially if the sealing-disk be composed of cork.

The very hard spots or masses of various sizes and forms found in all ordinary cork will, as hereinbefore indicated, render thin cork disks more or less defective as compressed sealing-disks whenever such hard matter is located in that annular portion of a disk which is compressed between a cap and the packing-surface of a bottle. I therefore, prior to the application of the disks to bottles, free the disks from said hard spots. In other words, I subject them to a heavy pressure, which breaks or crushes and disintegrates the normally hard masses, so that they cannot operate obstructively during the compression of the disk between the bottle and the cap. This crushing operation may be performed prior to the insertion of the disks into the caps; but it is best accomplished at the time the disk is forced into the cap, the latter having had its interior already coated with a film of well-dried shellac, and then heated sufficiently to melt the shellac and render it adhesive, it being always too insufficient in quantity to cause it to flow and to fill the holes or pits in the cork, as will now be described.

Referring to Figs. 4, 6, 7, 8, 9, and 10, it is to be understood that the cap B is developed from a thin tinned iron disk $g$, Fig. 8, which is first struck up and formed into the shape shown in B', Fig. 9. The flange $d$ of this cap B' is flared to a greater extent than in the finished cap B, as will be seen upon a comparison of Figs. 9 and 10. A cork disk as received from the cork-cutting machine is placed in the cap B', previously coated inside with shellac and well heated, and then subjected to heavy crushing pressure in suitable dies, and the edge of the flange is compressed, thereby flattening the inner lower portions of the corrugations and slightly reducing the diameter of the flange at and near its edge. Under this operation the hard spots in the cork are not only crushed, but the cork disk is developed into a concavo-convex form, and it is also well confined in the cap by the melted shellac.

The cap B, having the rounded edge at its top, is free from liability of displacement or partial loosening under such edgewise blows on the cap as are incident to handling filled bottles, and said rounding of the top edge also prevents the metal from being lifted at said edge out of packing contact, even if the center of the cap should be lifted or sprung outwardly under specially powerful gaseous pressure, and therefore it is to be understood that the well-rounded top is an important feature of novelty, but that with respect of its corrugations it is substantially in accordance with my previous disclosures; but in some of my prior caps the edge of the flange was flattened or flared for the sole purpose of causing said edge to lie closely in contact with the surface of a bottle-head rounded outwardly immediately below the locking-shoulder, whereas in my present combination said flattened edge is for an exactly opposite purpose, or, in other words, so as to locate it remotely from the adjacent surface of the bottle-head, which is straight and inclined below the locking-shoulder for a suitable distance, so as to afford the specially useful annular space below and at the rear of the lower portion of the flange. It will also be readily understood that the form and character of the corrugations are immaterial to my present invention, inasmuch as they may be long, short, large, small, straight, or spiralled, because in either case the flanges are to be always bent or crimped into locking contact with the annular shoulder on the bottle-head in such a manner as to afford the annular space $e$, this being wholly independent of the corrugations.

Having thus described my invention, I claim as new and desire to secure by Letters Patent—

1. The combination, with a bottle having a head provided with an annular locking-shoulder adjacent to its lip and a straight or inclined surface below the recess beneath said shoulder, of a metallic sealing-cap containing a sealing-disk and having a flange which is bent or crimped into locking contact with said shoulder above the edge of the flange, the said edge being located remotely from the adjacent surface of the bottle-head to afford between the lower portion of the flange and the adjacent surface of the bottle-head an annular space which is freely accessible to any pointed instrument applied for detaching the cap, substantially as described.

2. The combination, with a bottle having a head provided with an annular locking-shoulder adjacent to its lip and a straight or inclined surface below the recess beneath said shoulder, of a metallic sealing-cap containing a sealing-disk, and having a flaring-edged flange which is bent or crimped into locking contact with said shoulder above its flared edge, the latter being located remotely from the adjacent surface of the bottle-head to afford between the lower portion of the flange and the adjacent surface of the bottle-head an annular space which is freely accessible to any pointed instrument applied for detaching the cap, substantially as described.

3. The combination, with a bottle having on its head and between its lip and neck an annular locking-shoulder and a rounded packing-surface above and extending to the lip from said shoulder, of a metallic cap containing a thin concavo-convex heavily-compressed sealing-disk and having a top which is rounded in conformity with the packing-surface on the bottle-head and has a flange which is bent or crimped into locking contact with said shoulder, substantially as described.

4. A metallic flanged sealing-cap adapted to receive the head of a bottle and containing a concavo-convex sealing-disk and an interposed film of inodorous and tasteless adhesive matter which not only secures reliable initial union of the cap and disk, but also protects the interior surface of the cap against corrosion by liquids permeating the disk, and also prevents metallic tainting of the contents of a bottle sealed by means of said cap and disk, substantially as described.

WILLIAM PAINTER.

Witnesses:
T. R. ALEXANDER,
ORRIN C. PAINTER.